United States Patent [19]

Nolan et al.

[11] Patent Number: 5,074,143
[45] Date of Patent: Dec. 24, 1991

[54] CART FOR REMOVING AND INSTALLING DIES IN A CUT-OFF PRESS

[75] Inventors: John H. Nolan, Mt. Clemens; Dennis Skvarce, Wixom; Steven A. Chamulak, Canton; Paul Lagraff, Wixom, all of Mich.

[73] Assignee: Alpha Industries, Inc., Novi, Mich.

[21] Appl. No.: 450,410

[22] Filed: Dec. 14, 1989

[51] Int. Cl.$^5$ ............................................. B21J 13/08
[52] U.S. Cl. ...................................... 72/446; 72/448; 29/824; 83/318
[58] Field of Search .................... 72/441, 446, 448; 29/568, 824; 83/319, 618, 320, 559, 560, 318

[56] References Cited

U.S. PATENT DOCUMENTS

| 3,368,479 | 2/1968 | Gregorovich | 100/229 |
| 3,559,522 | 2/1971 | Valente et al. | 83/571 |
| 3,831,427 | 8/1974 | Lee | 72/448 |
| 4,149,438 | 4/1979 | Hori | 83/319 |
| 4,376,401 | 3/1983 | Borzym | 83/319 |
| 4,614,108 | 9/1986 | Bolle et al. | 72/446 |
| 4,660,406 | 4/1987 | Rugh et al. | 72/448 |
| 4,741,092 | 5/1988 | Labarre | 72/446 |
| 4,949,569 | 8/1990 | Young et al. | 72/446 |

FOREIGN PATENT DOCUMENTS 3620964 1/1988 Fed. Rep. of Germany ........ 72/446

Primary Examiner—David Jones
Attorney, Agent, or Firm—Krass & Young

[57] ABSTRACT

A die cart adapted to be used for the removal and installation of a cut-off die set from the carriage of a cut-off press. Whereby a slide member operating on a set of guide rails mounted to an independent frame and driven by a drive screw assembly is coupled to the die set. The drive screw assembly is then rotated to pull the die set off the carriage of the cut-off press onto the die cart and the die cart is then removed. Further, the guide rails are pivotal about a point on the frame to enable the die cart to install and remove cut-off die sets secured from the inclined carriage of a cut-off press.

4 Claims, 4 Drawing Sheets

CART FOR REMOVING AND INSTALLING DIES IN A CUT-OFF PRESS

FIELD OF THE INVENTION

This invention relates to die transfer devices and more particularly to a die cart for use in removing and installing a cut-off die from the carriage of a cut-off press.

BACKGROUND OF THE INVENTION

Cut-off systems for use in cutting tubing as it continuously emanates from a tubing fabrication mill usually include a cut-off die set secured to a cut-off press. See U.S. Pat. Nos. 3,288,012; 3,288,011. See also U.S. Pat. Nos. 4,109,555 and 4,294,147 illustrating cut-off die sets.

An individual cut-off press can be used to sever a variety of tubing sizes. When the tubing size is varied, the tubemaker must install and secure to the cut-off press a cut-off die set corresponding to the particular tubing size. Further, if during the severing operation a die set requires replacement or repair, production of the tube mill must be temporarily halted in order to remove or repair the existing die set. Decreasing the time required to remove and install a cut-off die set decreases the down time of the tube mill which correspondingly increases the production and revenues of the tube maker.

Previously die sets were manually removed and installed by the tubemaker. The tube maker manually removes the die set by physically grasping and pulling the die set from the cut-off press onto a flat table or cart, the die set is installed in a reverse manner. Since the physical size of a die set increases with the size of the tubing, the amount of work required to remove or install a die set also increases with the size of the tubing. Eventually, the size of the die set increases to a point where the tubemaker is unable to manually install or remove the die set. Thus in order to remove or install a large die set the tubemaker requires some type of mechanical assistance.

Additionally, many cut-off presses utilize a carriage slidably mounted in the press bed on an incline. See U.S. Pat. No. 4,376,401. Manually installing and removing a die set from an inclined carriage is a difficult and time consuming chore and in the case of large die sets requires mechanical assistance.

Applicants' device provides the required mechanical assistance to quickly and efficiently install and remove a cut-off die set from a cut-off press.

SUMMARY OF THE INVENTION

This invention is directed to a die cart for use in removing and installing a cut-off die to the carriage of a cut-off press.

According to the invention the die cart is secured to a cut-off press having a front member. A first frame, having a plurality of vertical leg members interconnected and braced by cross members, has a set of wheels mounted on the bottom thereof. A second frame including a pair of parallel and spaced apart guide rails mounted thereto, is mounted to the top surface of the first frame. A slide member is mounted for reciprocal motion on the guide rails. A drive means mounted to the second frame engages the slide hook and reciprocates the slide member on the guide rails. A pilot block mounted to the die cart engages the front member of the cut-off press and combined with a lock pin secures the die cart to the cut-off press. According to a further feature of the invention, the second frame is pivotally mounted to the first frame. A power means mounted between the first and second frames is used to rotate the second frame about the pivotal connection. This feature allows the operator to remove and install a die set from an inclined carriage of a cut-off press.

A second embodiment of the invention includes a locating member mounted to the first frame engaging a bore on the front member of the cut-off press. A clamping member pivotally mounted to the first frame clamps the die cart to the cut-off press.

DETAILED DESCRIPTION OF THE PREFERRED EMBODIMENT

Figure 1:
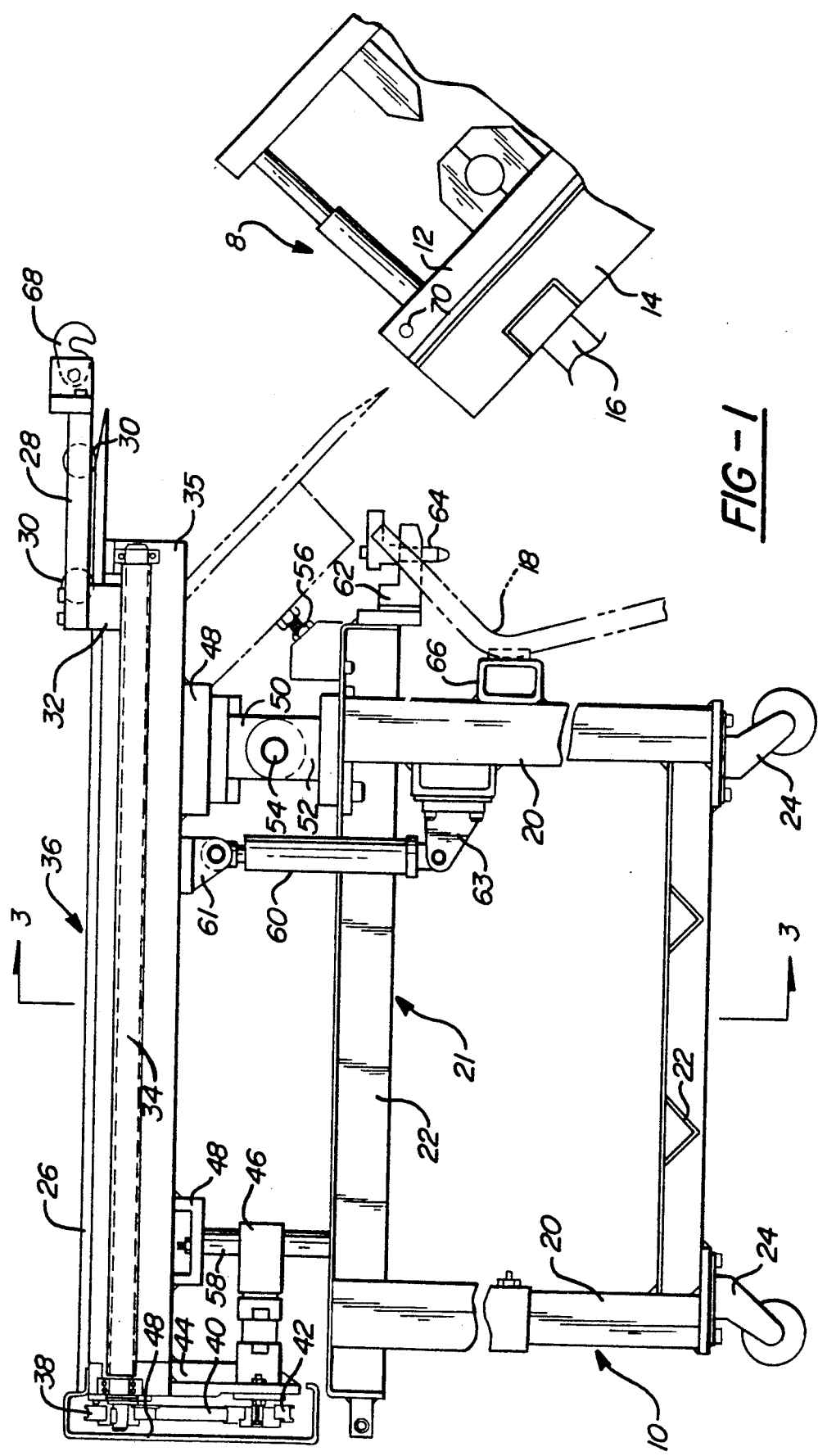
FIG. 1 is a side view of the die cart.
Figures 2, 3:
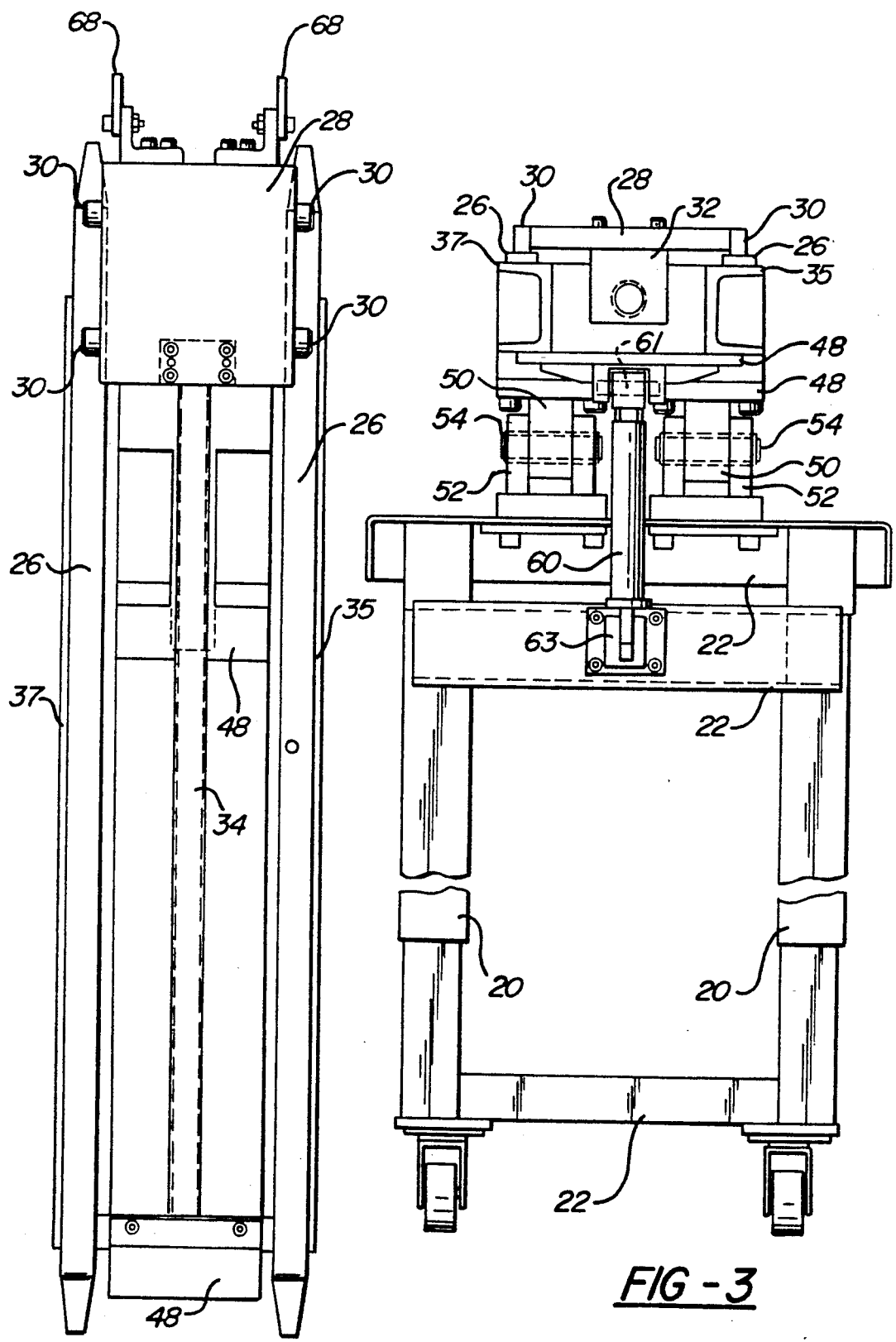
FIG. 2 is a top view of the die cart.
FIG. 3 is a cross-sectional end view taken along lines 3—3.

The illustrated die cart 10 according to the invention and as seen in FIG. 1-3 is used to install and remove a cut-off die set from the carriage of a cut-off press.

Referring to FIG. 1, FIG. 1 shows the lower platen 12 of the cut-off die set 8 mounted to an inclined carriage 14 which operates on a set of rails 16 mounted in the press bed. The press further includes a front wall portion 18 integral to the press body.

Referring to FIGS. 1-3, FIGS. 1-3 show the die cart having vertically upright frame members 20 and horizontal bracing members 22. The vertical members 20 are joined in a telescopic relationship which allows the vertical height of the die cart 10 to be adjusted. The vertical 20 and horizontal 22 members are interconnected and define a first frame 21 of the die cart 10. Wheels 24 are mounted to the lower surface of the first frame 21 to enable the operator to move the die cart 10.

A second frame 36, comprised of longitudinal members 35,37 and cross bracing members 48, is pivotally mounted on the top surface of the first frame 21 by means of a flange 50 connected to a clevis 52 by a pin 54. This mounting arrangement allows the second frame 36 to pivot about the pin 54. Stops 56 and 58 are used to control the angular travel of the second frame 36. Hydraulic cylinder 60, pivotally mounted to the second frame 36 by a pin and clevis 61 and pivotally mounted to the first frame 21 by a pin and clevis 63, provides the force needed to rotate the second frame 36 about the pivot pin 54. The hydraulic cylinder 60 swings the second frame 36 through an arcuate path limited by the stop 56 mounted to the first frame 21. When the hydraulic cylinder 60 is relaxed, the second frame 36 returns to a rest position determined by the stop 58. While the use of a hydraulic cylinder is used herein, applicant device may use any other power means to raise the second frame 36, such as an pneumatic cylinder or other mechanical means.

Mounted to the upper surface of the second frame 36 is a set of guide rails 26. A slide member 28 having wheels 30 operates in a reciprocal motion on the guide rails 26. A drive block 32 mounted to the slide member 28 threadably engages a lead screw 34. The lead screw 34 is journaled at each end in the second frame 36 whereby rotation of the lead screw 34 causes the slide member 28 to travel on the guide rails 26. The slide member 28 further includes a pair of pivotally connected hook members 68 which engage pins 70 located on the lower platen of the die set 8. While two hook members are shown a single hook may be used instead. Also any other means could be used to connect the slide member 28 to the die set 8.

A pulley 38 is mounted at one end of the lead screw 34 and is coupled by a drive belt 40 to a drive pulley 42 mounted on frame member 44. The drive pulley 42 is driven by an air motor/clutch combination 46 which provides the power to rotate the lead screw 34. A guard 48 is placed over the drive unit to protect against accidental injury. Changing the direction of rotation of the lead screw 34 allows an operator to reciprocate the slide member 28 on the guide rails 26.

The die cart is connected or secured to the press frame 18 by means of a pilot block 62 and a lock pin 64. When using the die cart, the pad 66 of the die cart 10 is placed adjacent to the front wall 18 of the cut-off press. The pilot block 62 engage the front wall 18 and the lock pin 64 secures the die cart 10 to the cut-off press. The pad 66 prevents further forward movement of the die cart and the pilot block 62 and lock pin 64 combination prevent any rearward motion.

To remove the die-set 8 from the carriage of a cut-off press, the operator must secure the die cart 10 to the front wall 18 of the press body using the pilot block 62 and lock pin 64 assembly. After the die cart 10 is secured to the press wall 18 the operator using the hydraulic cylinder 60 pivots the second frame 36 about the pivot pin 54 until the second frame 36 engages stop 56. After the second frame 36 engages stop 56 the air motor 46 is used to rotate the lead screw 34, causing the slide member 28 to travel inward on the guide rails 26 until the hook members 68, pivotally mounted to the slide member 28, engage the pins 70 mounted to the under platen 12 of the cut-off die set. Once the die set 8 is connected to the slide member 28 using the hook members 68 pins 70 the clamping mechanism which secures the die set 8 to the carriage 14, may be released. Reversing the direction of rotation of the lead screw 34 causes the die set to be pulled from the carriage 14 onto the guide rails 26. Once the die set 8 is completely on the guide rails 26, the hydraulic cylinder 60 returns the second frame 36 to a horizontal position determined by the stop 58. The die cart 10 is then released from the press wall 18 completing removal of the die set 8 from the cut-off press. Installation of a cut-off die set 8 in a cut-off press is accomplished in a reverse manner by using the slide member 28 and lead screw 34 to push the die set 8 from the guide rails 26 onto the carriage 14.

Figure 4:
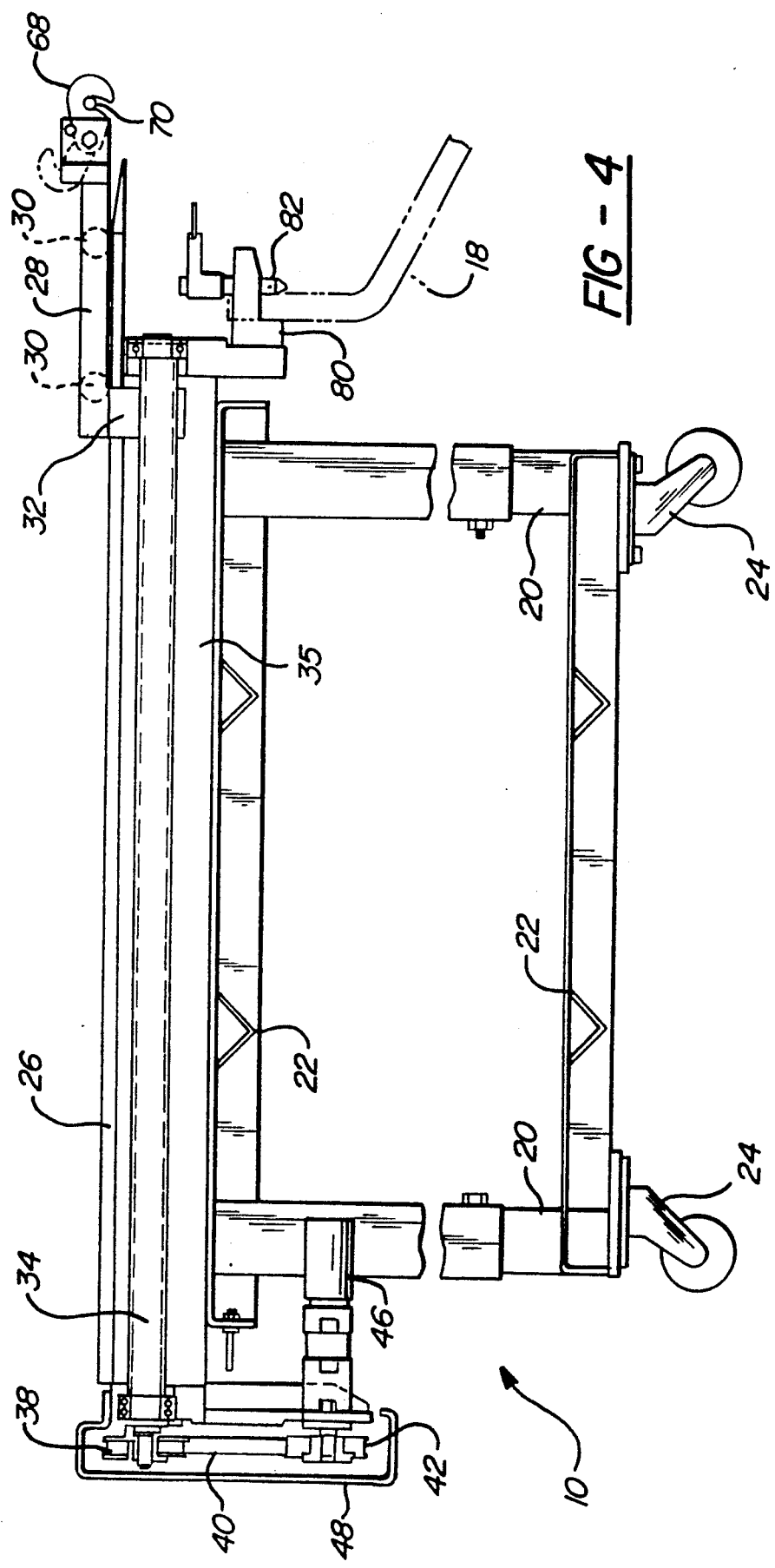
FIG. 4 is a side view of the die cart for horizontal use only.

Referring to FIG. 4, FIG. 4 shows another embodiment of the die cart 10, wherein the second frame member 36 is mounted to the upper surface of the first frame. The embodiment as shown in FIG. 4 is used to install or remove a die set 10 from a press carriage which is substantially horizontal. FIG. 4 also shows a second embodiment of a means to couple the die cart 10 to the press base 18 including a pilot block 80 and lock pin 82. As shown in FIG. 4, the die cart is placed adjacent the press wall 18 until stopped by the pilot block 80. The lock pin 82 is placed on the rear side of the press wall 18 and secures the die cart to the press wall 18. Once the die cart 10 has been secured to the press wall 18 the cart may operate to remove a die set as previously described.

Figure 5:
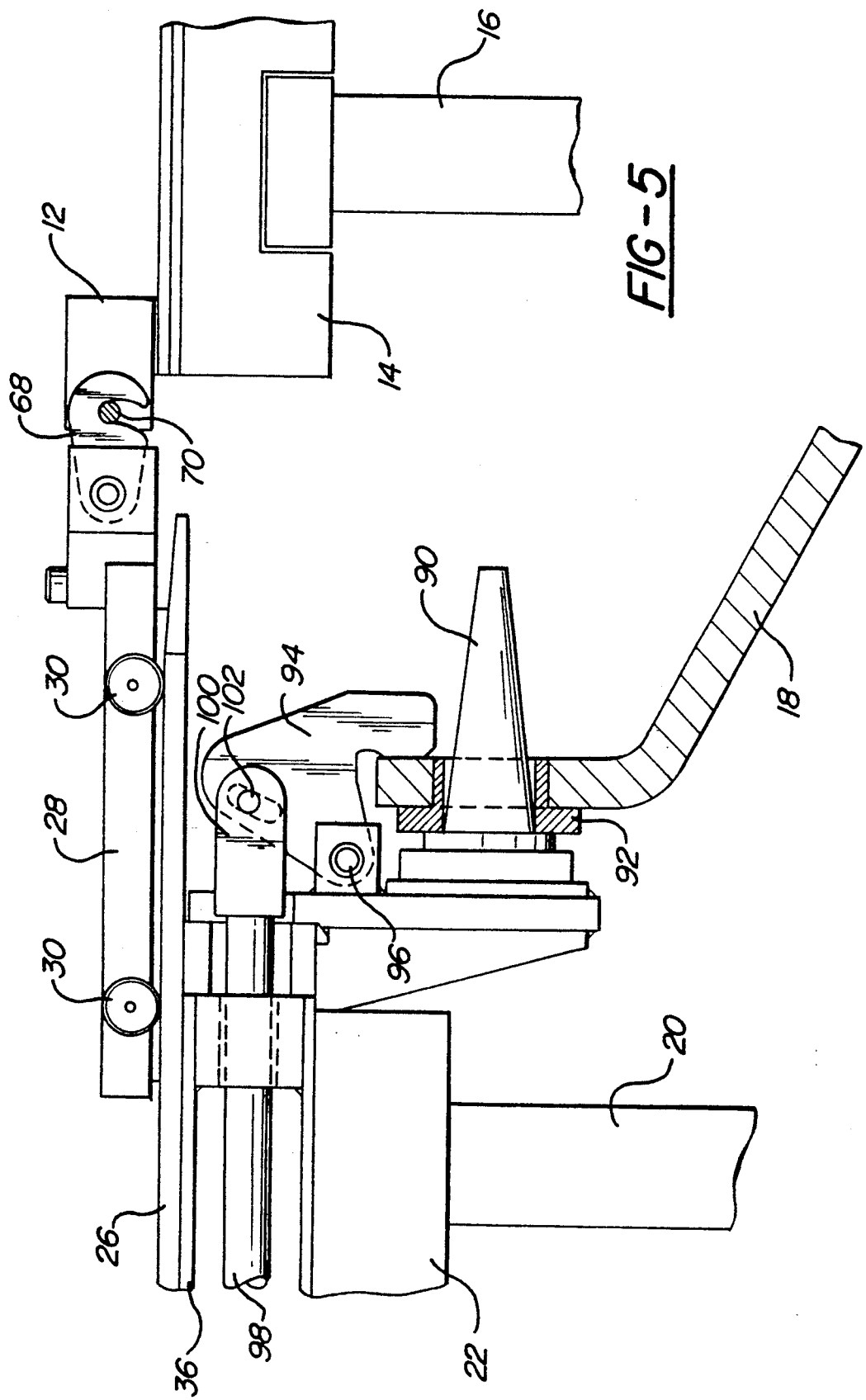
FIG. 5 is a view of a second embodiment to secure the die set to the press bed.

Referring now to FIG. 5, FIG. 5 shows an alternate embodiment for clamping the die cart 10 to the press wall 18. A guide pin 90 engages a bushing 92 placed in the press wall 18. Once the die cart 10 is placed in the proper position, i.e., the guide pin 90 engages the bushing 92, a clamping dog 94 pivoting about a clevis and pin combination 96 secures the die set to the press wall 18. The clamping dog 94 is actuated by a push rod 98 connected to the clamping dog by a clevis 100 and pin 102. When the push rod 98 is urged forward toward the press wall 18, the clamping dog 94 engages the rear surface of the press wall 18 and clamps the die cart 10 to the press wall 18. The die cart 10 is then operated in the previously described manner to remove the die set 8 from the carriage.

This invention will thus be seen to provide a simple and effective means to rapidly remove and install a cut-off die set from a cut-off press. By decreasing the time necessary to remove and install a cut-off die set the time the mill may remain in production is increased resulting in greater production and revenues for the tubemaker.

Although preferred embodiments of the invention have been illustrated and described in detail, it will be apparent that various changes may be made in the disclosed embodiments without departing from the scope of the invention. Moreover, the terms vertical and horizontal are used herein in a relative sense and do not suggest any given orientation of the mechanism described when placed into actual use.

We claim:

1. A die cart for removing and installing a cut-off die to the carriage of a cut-off press comprising:
   a cut-off press having a front member for securing the die cart;
   a first frame having a plurality of vertical leg members, further including cross members interconnected to and bracing the leg members;
   said first frame having upper and lower surfaces;
   a plurality of wheels mounted to the lower surface of said frame;
   a second frame having longitudinal members further including cross members interconnected to and bracing said longitudinal members secured to the upper surface of said first frame;
   a pair of parallel and spaced apart guide rails mounted to the second frame;
   a slide member mounted for reciprocal motion on the guide rails;
   drive means mounted to the second frame and engaging the slide member to reciprocate the slide member on the guide rails;
   a pilot block having a bore therein mounted to said second frame adapted to engage the front member of the cut-off press; and
   a lock pin inserted into said bore on said pilot block to secure said die cart to the cut-off press.

2. A die cart for removing and installing a cut-off die on the carriage of a cut-off press comprising:
   a cut-off press having a front member for securing the die cart;
   a first frame having a plurality of vertical leg members, further including cross members interconnected to and bracing the leg members;
   said first frame having upper and lower surfaces;
   a plurality of wheels mounted to the to the lower surface of said frame;

a second frame having longitudinal members, further including cross members interconnected to and bracing said longitudinal members;

said second frame pivotally connected to the upper surface of said first frame and rotating about an axis transverse the vertical members of said first frame;

a power means mounted between said first and second frames to rotate said second frame about said pivotal connection;

a pair of parallel and spaced apart guide rails mounted to the second frame;

a slide member mounted for reciprocal motion on the guide rails;

drive means mounted to the second frame and engaging the slide member to reciprocate the slide member on the guide rails;

a pilot block mounted to said first frame adapted to engage the front member of the cut-off press; and a lock pin engaging said pilot block to secure said die cart to the cut-off press.

3. A die cart for removing and installing a cut-off die to the carriage of a cut-off press comprising:

a cut-off press having a front member for securing the die cart;

a first frame having a plurality of vertical leg members, further including cross members interconnected to and bracing the leg members;

said first frame having upper and lower surfaces;

a plurality of wheels mounted to the lower surface of said frame;

a second frame having longitudinal members further including cross members interconnected to and bracing said longitudinal members secured to the upper surface of said first frame;

a pair of parallel and spaced apart guide rails mounted to the second frame;

a slide member mounted for reciprocal motion on said guide rails;

drive means mounted to the second frame and engaging the slide member to reciprocate the slide member on the guide rails;

a locating member mounted to the first frame adapted to engage a locating bore on the front member of the cut-off press; and a clamping member pivotally connected to said first frame to clamp the die cart to the cut-off press.

4. The device as defined in claim 3 wherein the second frame is pivotally connected to the first frame and rotates about an axis transverse the vertical leg members of said first frame; and a power means mounted between said first frame and said second frame to rotate said second frame about said pivotal connection.

* * * * *

UNITED STATES PATENT AND TRADEMARK OFFICE
CERTIFICATE OF CORRECTION

PATENT NO. : 5,074,143
DATED : December 24, 1991
INVENTOR(S) : John Nolan, Dennis Skvarce, Steven Chamulak, Paul Lagraff It is certified that error appears in the above-identified patent and that said Letters Patent is hereby corrected as shown below:

Column 4, Line 67, Please delete "to the to the lower" and insert -- to the lower --.

Signed and Sealed this

Thirtieth Day of March, 1993

Attest:

STEPHEN G. KUNIN

*Attesting Officer*   *Acting Commissioner of Patents and Trademarks*